United States Patent [19]
Gatof et al.

[11] 3,956,804
[45] May 18, 1976

[54] CLASP MECHANISM

[75] Inventors: Norman Gatof, New York, N.Y.;
Cornelis P. Schravendeel,
Weehauken, N.J.

[73] Assignee: Monet Jewelers, Inc., New York, N.Y.

[22] Filed: Dec. 12, 1974

[21] Appl. No.: 531,937

[52] U.S. Cl. .................................................. 24/235
[51] Int. Cl.² ........................................ A44B 13/02
[58] Field of Search ............... 24/201 BN, 235, 234, 24/157 P

[56] References Cited
UNITED STATES PATENTS

| | | | |
|---|---|---|---|
| 265,143 | 9/1882 | Rairigh | 24/235 UX |
| 590,913 | 9/1897 | Sharp | 24/235 X |
| 682,684 | 9/1901 | Hakemeyer | 24/235 X |
| 931,588 | 8/1909 | Forstner | 24/235 |
| 2,083,613 | 6/1937 | Morehouse | 24/157 P |
| 2,283,328 | 5/1942 | Goodwin | 24/157 P UX |
| 2,411,037 | 11/1946 | Hess | 24/157 P UX |
| 2,624,092 | 1/1953 | Duerr | 24/235 |
| 2,795,024 | 6/1957 | Donaldson | 24/235 X |

*Primary Examiner*—Donald A. Griffin
*Attorney, Agent, or Firm*—Gene O. Enockson; L. MeRoy Lillehaugen

[57] ABSTRACT

A clasp construction for interconnecting the ends of a chain, bracelet, necklace, or the like, together. The clasp is comprised of two components which are spring-loaded, and pivotally connected together. By exerting a gripping force against the clasp, the components can be pivoted relative to each other, thus permitting the clasp to be attached to, or separated from, a chain link, ring, or the like.

5 Claims, 7 Drawing Figures

CLASP MECHANISM

The present invention relates to jewelry, and more specifically to an improved spring-loaded clasp mechanism for use with jewelry items such as necklaces, bracelets, and the like, which often utilize small chains as a safety feature.

As known to those familiar with the jewelry art, various types of clasps are used for interconnecting two free ends of a small chain together, or perhaps for connecting one end of such a chain to a fixed loop. Charms which are attached to a charm bracelet, are another form of jewelry piece which often includes and utilizes a clasp for detachably securing the charm to a bracelet. Quite often, small chains of the type referred to, are used as a safety precaution for preventing a jewelry piece from becoming lost in the event that a latch mechanism which connects two ends of the jewelry piece together, fails. On the other hand, it is desirable to be able to disconnect the chain or charm under certain circumstances.

Clasps of the type known in the art, are usually quite small, yet they require a fairly rugged construction because they are subjected to a substantial amount of wear. Perhaps one of the most common types of such clasp known is one referred to commonly as a spring ring. In general, such a device is formed as having a tubular body which is substantially circular in configuration, and two spaced-apart ends. A spring-loaded movable member or plunger is slidably mounted within one of the end portions of the body, and it is urged to abut against the opposite end of the body to form a ring, which can be opened to engage another member.

Such clasps have certain disadvantages. For example, the spring loaded member is subjected to the most wear because it often bears against the other end of the chain; as a result, it becomes worn and is easily broken. Moreover, the spring itself ofttimes loses its resiliency after being operated repeatedly; the spring is free floating within the tubular body; the spring tension decreases as the relative opening decreases; usually the opening provided when the movable member is retracted is quite small in size; and moisture can enter the tubular body and cause the components to corrode.

Accordingly, one object of the present invention is to provide an improved clasp mechanism for use with jewelry pieces.

Another object is to provide an improved spring-loaded clasp construction which can be readily manipulated to accommodate attachment to, and detachment from, a chain link or other retaining member.

A further object is to provide a spring-loaded clasp mechanism for use with small jewelry chains, in which the spring tension remains substantially constant during operation.

A still further object is to provide a clasp mechanism for use as a safety component with jewelry pieces, which is rugged in construction, reliable in securability, relatively easy to manipulate, and relatively inexpensive to manufacture.

Other objects and advantages of the invention will become apparent from a consideration of the following specification and accompanying drawings. Before proceeding with the detailed description of the invention however, a brief description of it will be presented.

In general, the invention comprises a pair of similarly shaped body members which are pivotally connected to each other. Each body member includes a hook-shaped jaw and a small cavity in one surface. A rivet is provided for pivotally connecting the members together so that the cavities are juxtaposed, and together they form a compartment. A small spring is positioned within the compartment formed by the cavities, and it maintains the members in a spring-loaded condition with respect to each other, so that the jaws form an enclosure which can be opened when desired.

The invention will best be understood by reference to the following drawings, wherein.

Figure 1:
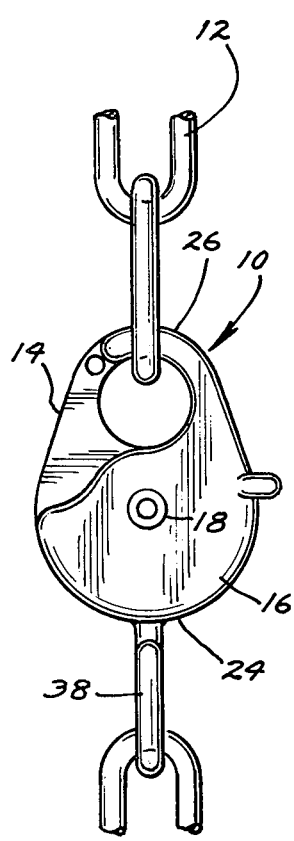
FIG. 1 is a front elevational view of a clasp mechanism connecting two ends of a chain together.

FIG. 1 illustrates a spring-loaded clasp designated generally by reference numeral 10, as linking two ends of a small chain 12 together. As pointed out above, small chains of this type, are ofttimes used in conjunction with a necklace or bracelet having latching means for connecting and disconnecting two ends of the necklace or bracelet relative to each other. The chain serves as a safety device if the ends of the jewelry piece should inadvertently become unlatched or disconnected. While the clasp 10 is shown as connecting two ends of a small chain together, it must be recognized that it might be used for other purposes as well. For example, it might be used for removably securing charms to a charm bracelet, or if preferred, it might be used as the main latching device for connecting the ends of a necklace or bracelet together.

The spring clasp 10 is comprised of a first body member or component 14 which is pivotally connected to a second body member or component 16 by a shaft or rivet 18 inserted through bores 20 and 22 in the members 14 and 16 respectively. While the body members 14 and 16 have substantially the same size and shape, each includes minor features which make them slightly different when compared to each other.

Figure 2:
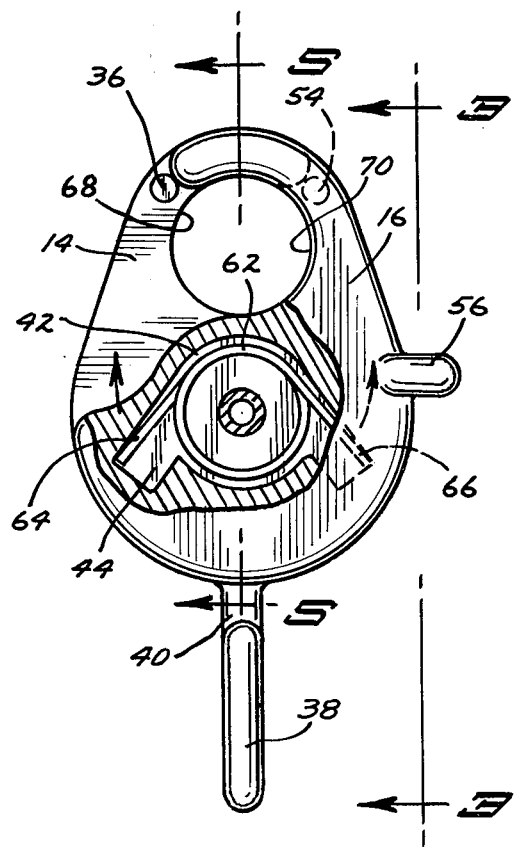
FIG. 2 is an enlarged view with parts broken away, of the mechanism shown in FIG. 1, in a closed condition.
Figure 3:
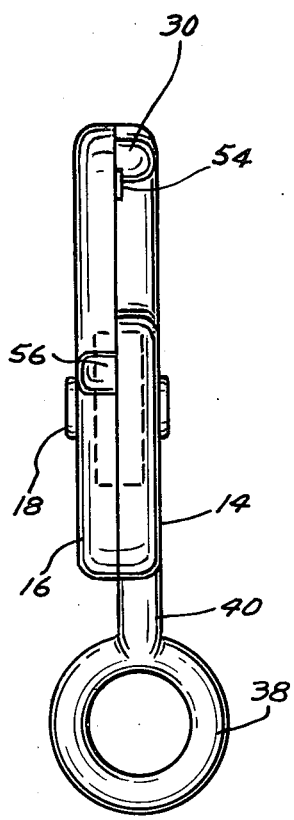
FIG. 3 is a side elevational view of the mechanism taken along line 3—3 of FIG. 2.

As illustrated in FIGS. 1 and 2, the outer configuration of the clasp 10 is generally flattened, and it has a somewhat egg-shaped configuration in that its base 24 is somewhat larger than its apex 26. As shown more clearly in FIG. 6, member 14 includes a main body portion 28 having a first surface 30 and a second surface 32. The body portion 28 has a somewhat circular shape, the upper portion of which has been removed. A hook-shaped extension or jaw 34 forms an integral part of the body portion 28, and it projects upwardly as viewed in the figures. A small knob 36 is located on the jaw 34, and it is spaced a short distance from the end of the jaw. A small ring 38 is integrally connected to the base or bottom of the body portion 14 by means of a short extension or stem 40. The ring 38 is oriented relative to the body portion so that it is perpendicular to the first and second surfaces of the member 14. The ring is provided for permanently connecting the clasp to a chain link, jewelry piece, or the like. A shallow, circular cavity 42 is formed in the surface 30, and the bore 20 is located proximate the center of this cavity. The cavity 42 includes a short tail or extension 44 which projects tangentially from the cavity.

The member 16 has substantially the same size and configuration as the member 14. It includes a main body portion 46 having first and second surfaces 48 and 50, and a hook-shaped extension or jaw 52. A knob 54 is located on the jaw 52, and it is spaced a short distance from the jaw end. A protrusion or knob 56 projects from the edge of the body 46, and it is spaced some distance from the ring 38. A shallow circular cavity 58 is formed in the surface 50 and the bore 22 is positioned proximate its center. The cavity 58 is provided with an extension or tail 60 which projects tangentially from the cavity. The cavities 42 and 58 are substantially the same size and configuration, and they are substantially identically located on the surfaces 30 and 48 respectively.

Figure 6:
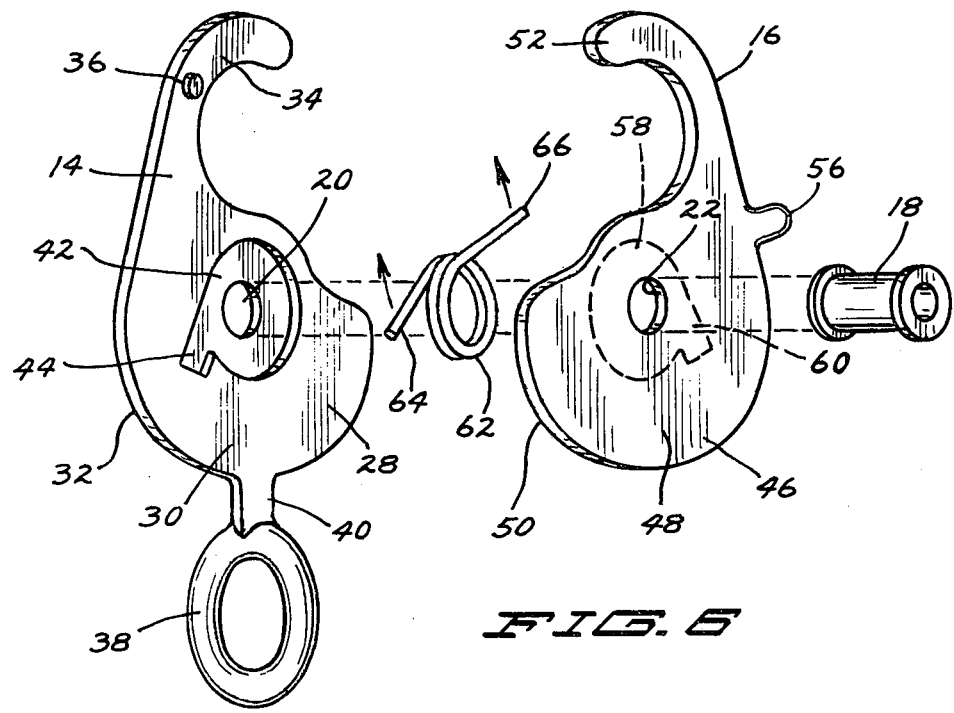
FIG. 6 is an exploded perspective view of the clasp.

As illustrated in FIG. 6, the body members 14 and 16 are oriented with respect to each other so that the surfaces 30 and 50 are juxtaposed. By aligning the bores 20 and 22, with respect to each other and inserting the rivet 18 therethrough, the members 14 and 16 are pivotally connected to each other. In this assembled condition, the cavities 42 and 58 together form a single compartment in which the extensions 44 and 60 project in opposite directions, and the jaws 34 and 52 project toward each other so as to form an encirclement 68. As can be observed, the ends of the jaws by-pass each other when the clasp is in its closed condition so that a double bearing surface is formed. Pivotal movement of the body members relative to each other is limited when the jaw ends 34 and 52 abut against the knobs 54 and 36 respectively.

A coil spring 62 is provided for spring loading the clasp 10. The spring is positioned within the compartment formed by the cavities 42 and 58, so that it surrounds the rivet 18. The ends 64 and 66 of the spring project into the tail portions 44 and 60 respectively, and are retained therein. The spring ends 64 and 66 are biased so that they exert a force against the members 14 and 16, which tends to pivot the jaws 34 and 52 toward each other so that they assume a normally closed position, as shown in FIGS. 1 and 2. In other words, as viewed in FIG. 2, the member 14 is biased in a clockwise direction while the member 16 is biased in a counter-clockwise direction.

Figure 4:
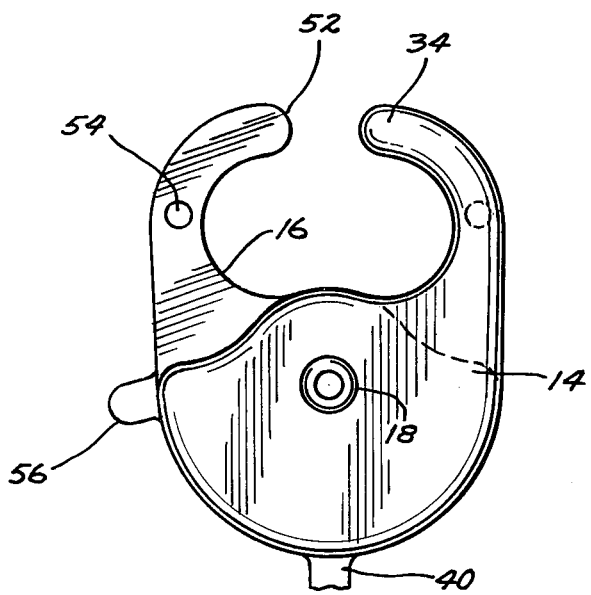
FIG. 4 is a rear elevational view similar to FIG. 2, but illustrating the mechanism in a partially open condition.
Figure 5:
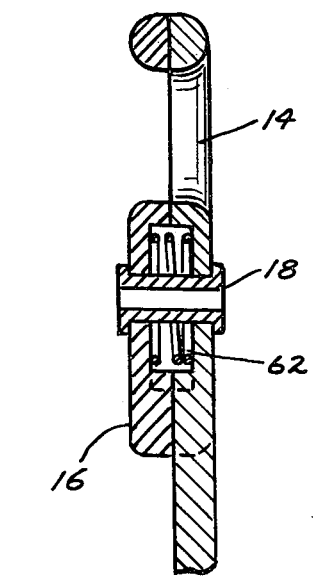
FIG. 5 is a partial sectional view taken along line 5—5 of FIG. 2.

In operation, the spring-loaded clasp 10 is manipulated by engaging the small ring 38 on the member 14 with a first finger, and the knob 56 on the member 16 with a second finger. By gently squeezing the fingers together, the members 14 and 16 will pivot against the biasing action of the spring 62 so that the jaws 34 and 52 separate or open, as depicted in FIG. 4. A chain link 12 can then be inserted between the open jaws, whereupon the squeezing force on the ring 38 and knob 56 is removed. The biasing action of the spring 62 urges the jaws to return to their initial closed position. When in its closed condition, the end of the jaw 34 abuts against the protrusion 54, while the end of the jaw 52 abuts against the protrusion 36.

As can be readily discerned from the drawings, both the jaws 34 and 52 present a surface against which the link 12 bears. This results in a mechanism which is relatively strong in construction, and unusually safe because the two jaws present a positive closure when urged to the closed condition by the spring. Moreover, since the spring is retained within the cavities formed in the body members, it is not free floating, and the spring action is substantially constant when the jaws are opened. When the jaws are pivoted, an unusually wide opening is formed which makes it easy for the user to secure the clasp to a chain link or other member.

Figure 7:
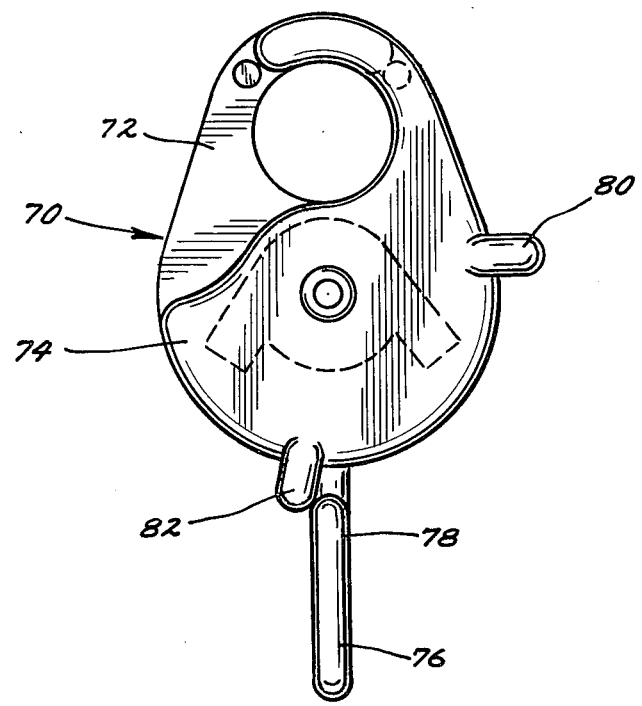
FIG. 7 illustrates another embodiment of the invention.

FIG. 7 illustrates a modified form of the invention. In certain circumstances it is desirable to have the clasp as small as possible. At some point in miniaturizing the clasp, the protrusions 36 and 54 become so small that they fail to engage the ends of the jaws when the jaws are closed. The clasp 70 depicted in FIG. 7 is substantially the same as the clasp 10 described hereinbefore, in that it has two components 72 and 74 which are pivotally connected together. Each component is provided with a jaw as described previously. A small ring 76 and stem 78 form an integral part of the component 72, and a protrusion 80 projects from the edge of the body 74. In addition, a second protrusion 82 projects from the edge of the component 74 proximate its base so that it abuts against the ring 76 when the jaws are closed. Preferably the protrusion 82 is somewhat smaller in size than the protrusion 80. If preferred, knobs similar to knobs 36 and 54 described above, can be included as well, although it may be preferred to eliminate them completely.

In operation, the spring-loaded jaws of clasp 70 are opened in the same manner as the jaws of FIGS. 1-6. As the component 74 pivots in a clockwise direction relative to the component 72 (as viewed in FIG. 7), the protrusion 82 moves away from the stem 78 and ring 76. When the gripping force exerted on the components 72 and 74 is removed, the jaws close and the projection 82 returns to its initial position proximate the ring 76.

In the above description and attached drawings, a disclosure of the principles of this invention is presented, together with a specific embodiment by which the invention might be carried out.

Now therefore we claim:

1. A clasp for connecting two members together comprising a first body member which includes a main body portion and a hook-shaped jaw integrally connected thereto, said body portion having first and second surfaces, a second body member which includes a main body portion and a hook-shaped jaw integrally connected thereto, said body portion having first and second surfaces, means for pivotally connecting said body members together so that hook-shaped jaws project toward each other so as to form an encirclement, the ends of said jaws by-passing each other when the clasp is in a closed condition, means for limiting pivotal movement of said jaws beyond a predetermined point, said limiting means including a knob located on each jaw against which the other jaw end abuts, biasing means for urging said body members in opposite directions relative to each other about the pivot point, each body member including a cavity having a circular shape, formed in one of its surfaces, said cavities being juxtaposed when said body members are pivotally connected together thereby forming a compartment, means for positioning said biasing means within said compartment, said biasing means comprising a coil spring having first and second ends, means for securing the first end of said spring to the first body member, and means for securing the second end of said spring to the second body member, the means for securing the ends of the spring to the body members including tangential extensions of the cavities within which the ends of the spring are retained, said extensions projecting in opposite directions relative to each other, and means for gripping said clasp and pivoting said body members relative to each other against the force of said biasing means whereby said jaws can be separated so as to permit an object to be inserted therebetween.

2. The combination of claim 1 wherein a shaft is provided for pivotally connecting the body members together, said shaft being mounted in bores formed in the body members and projecting through the cavities formed in said members, a portion of said coil spring surrounding said shaft.

3. A clasp for connecting two members together comprising a first body member which includes a main body portion and a hook-shaped jaws integrally connected thereto, said body portion having first and second surfaces, a second body member which includes a main body portion and a hook-shaped jaw integrally connected thereto, said body portion having first and second surfaces, means for pivotally connecting said body members together so that said hook-shaped jaws project toward each other so as to form an encirclement, the ends of said jaws by-passing each other when the clasp is in a closed condition, means for limiting pivotal movement of said jaws beyond a predetermined point, biasing means for urging said body members in opposite directions relative to each other about the pivot point, each body member including a cavity having a circular shape, formed in one of its surfaces, said cavities being juxtaposed when said body members are pivotally connected together thereby forming a compartment, means for positioning said biasing means within said compartment, said biasing means comprising a coil spring having first and second ends, means for securing the first end of said spring to the first body member, and means for securing the second end of said spring to the second body member, the means for securing the ends of the spring to the body members including tangential extensions of the cavities within which the ends of the spring are retained, said extensions projecting in opposite directions relative to each other, means for gripping said clasp and pivoting said body members relative to each other against the force of said biasing means whereby said jaws can be separated so as to permit an object to be inserted therebetween, said gripping means including a member secured to one of the body members, and the limiting means includes a protrusion which projects from the edge of the other body member, said protrusion abutting against said member when the jaws are in a closed condition.

4. The combination of claim 3 wherein the gripping means includes a first member secured to one of the body members, and a second member secured to the other body member, said first and second members being spaced from each other.

5. The combination of claim 4 wherein said first member comprises a small ring integrally connected to the base of the body member, and the second member comprises a knob which projects from the edge of the other body member, said protrusion adapted to abut against said ring.

* * * * *